(12) United States Patent
Kang

(10) Patent No.: US 7,602,466 B2
(45) Date of Patent: Oct. 13, 2009

(54) 2-DIMENSIONAL AND 3-DIMENSIONAL IMAGE DISPLAY DEVICE AND METHOD OF MANUFACTURING THE SAME

(75) Inventor: Hoon Kang, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 277 days.

(21) Appl. No.: 11/607,255

(22) Filed: Nov. 29, 2006

(65) Prior Publication Data

US 2007/0159566 A1 Jul. 12, 2007

(30) Foreign Application Priority Data

Dec. 28, 2005 (KR) .................. 10-2005-0131706

(51) Int. Cl.
  *G02F 1/1335* (2006.01)
  *G02F 1/1347* (2006.01)
  *G02F 1/1343* (2006.01)
(52) U.S. Cl. ..................... 349/141; 349/15; 349/74
(58) Field of Classification Search .............. 349/15, 349/74, 141
See application file for complete search history.

(56) References Cited

U.S. PATENT DOCUMENTS

| 5,945,965 | A * | 8/1999 | Inoguchi et al. ................. 345/6 |
| 5,969,850 | A * | 10/1999 | Harrold et al. ............... 359/320 |
| 6,437,915 | B2 * | 8/2002 | Moseley et al. ............. 359/465 |
| 7,058,252 | B2 * | 6/2006 | Woodgate et al. ............. 385/16 |
| 7,095,471 | B2 * | 8/2006 | Wu ............................. 349/141 |
| 7,199,845 | B2 * | 4/2007 | Koyama et al. ............... 349/15 |
| 2004/0207792 | A1 * | 10/2004 | Wu ............................. 349/141 |
| 2006/0203338 | A1 * | 9/2006 | Pezzaniti ..................... 359/465 |

* cited by examiner

*Primary Examiner*—Uyen Chau N Le
*Assistant Examiner*—John M Bedtelyon
(74) *Attorney, Agent, or Firm*—Brinks Hofer Gilson & Lione

(57) ABSTRACT

A 2-dimensional and 3-dimensional image display device and a method of manufacturing the same is described. The display device includes an image display panel for displaying an image, and a switching panel having upper and lower substrates with a liquid crystal layer interposed therebetween. A pixel electrode, and first and second common electrodes, are formed on the lower substrate of the switching panel.

7 Claims, 8 Drawing Sheets

2-DIMENSIONAL AND 3-DIMENSIONAL IMAGE DISPLAY DEVICE AND METHOD OF MANUFACTURING THE SAME

This application claims the benefit of Korean patent application P05-0131706, which was filed on Dec. 28, 2005, and is incorporated herein by reference.

TECHNICAL FIELD

The present application relates to a display device and a method for manufacturing the same. In particular, a 2-dimensional and 3-dimensional image display device is described in which a color change over a range of viewing angles is small.

BACKGROUND

There is a need for a display device capable of displaying 3-dimensional images. Such a display device may be used as a new media in an advertising field, a home 3-dimensional multimedia image display terminal, an image display terminal for simulation and education/training, a visualization image display terminal for precise measurement and diagnosis, a medical 3-dimensional image display terminal, a 3-dimensional image monitor for video conference and advertisement, a 3-dimensional television for broadcasting, an image display terminal for education/entertainment, manufacturing parts for various kinds of special environments, an image device for 3-dimensional game, various heads-up displays for airplanes and vehicles, or the like.

Methods of displaying 3-dimensional images may be classified into two types: a 2-viewpoint type, and a multiple viewpoint type. The 2-viewpoint type displays respective images for left and right eyes one by one, whereas the multiple viewpoint type displays a binocular parallax image in wide variety of directions. In case of the multiple viewpoint type, a resolution decreases in proportion to the number of viewpoints, whereas a degree of freedom of viewing position is higher, so that it is possible to naturally see the 3-dimensional image.

As a method of focusing the image data for left and right eyes on the left and right eyes, respectively, a parallax barrier method, a lenticular method or the like are used.

FIG. 1 is an exploded perspective view of a related art display device capable of displaying 2-dimensional and 3-dimensional images, and FIG. 2 is a schematic view illustrating display of the 3-dimensional image using the related art display device of FIG. 1.

A liquid crystal display (LCD) device for displaying a 3-dimensional image using a parallax barrier panel 3 is provided with a backlight unit 1, an image display panel 5 for displaying an image by light generated from the backlight unit 1, The parallax barrier panel 3 is disposed between the backlight unit 3 and the image display panel 5.

The image display panel 5 is has an upper substrate on which a color filter layer is formed, and a lower substrate on which a thin film transistor (TFT) as a switching device and a pixel electrode are formed. A liquid crystal layer is interposed between the upper and lower substrates.

The parallax barrier panel 3 utilizes the principle of binocular parallax between left and right eyes, which makes it possible to see the image 3-dimensionally. As shown in FIG. 2, image data for the left eye and image data for the right eye are inputted into the image display panel 5 (minimally, two viewpoints). It is possible to see the 2-dimensional image as a 3-dimensional image by intentionally focusing left and right eye images on an observer's left and right eyes, respectively. That is, by inputting two image data on sets a screen and producing left and right eye images separately focused on the left and right eyes, respectively, the 2-dimensional plane image can be perceived as a 3-dimensional image.

The parallax barrier panel 3 is divided into a plurality of areas 4a for propagating the light toward an observer's left eye, and a plurality of areas 4b for propagating the light toward an observer's right eye.

Assuming that a distance between the left and right eyes is about 65 mm and a distance within which the observer can see the image ranges from 25 cm to 30 cm, for example, the parallax barrier panel 3 should be designed such that the left and right images are focused on the left and right eyes, respectively, within distances the in range of 25 cm to 30 cm from the image display panel 5.

However, the parallax barrier panel 3, which is used as a switch panel, generally uses a twisted nematic (TN) mode liquid crystal panel in which a common electrode is disposed on an upper substrate and a pixel electrode is disposed on a lower substrate. The viewing angle is quite narrow and a color change becomes large over a range of viewing angles of the 3-dimensional image (see FIG. 9A).

The response speed of a liquid crystal is slow in response to an electric field in the TN mode switching panel, and this also limits the quality of the display.

SUMMARY

A 2-dimensional and 3-dimensional image display device is described. An electrode structure of a switching panel is modified into an in-plane switching (IPS) mode structure or a fringe field switching (FFS) mode structure, in which a pixel electrode and a common electrode are formed on a lower substrate thereof.

A display device includes an image display panel for displaying an image, a switching panel including upper and lower substrates with a liquid crystal layer interposed therebetween. A pixel electrode, and first and second common electrodes are formed on the lower substrate. A backlight unit for supplying light to the image display panel and the switching panel may also be provided. In another aspect, a method of manufacturing a display device includes forming a first common electrode on a substrate; forming a first protective layer on the substrate on which the first common electrode is formed; forming a second common electrode on the first protective layer; forming a second protective layer on the substrate on which the second common electrode is formed; forming a pixel electrode on the substrate on which the second protective layer is formed; forming an alignment layer on the substrate on which the pixel electrode is formed, and rubbing the alignment layer.

DETAILED DESCRIPTION

Exemplary embodiments may be better understood with reference to the drawings, but these examples are not intended to be of a limiting nature. Wherever possible, the same reference numbers will be used throughout the drawings to refer to the same or like parts.

When a specific feature, structure, or characteristic is described in connection with an example, it will be understood that one skilled in the art may effect such feature, structure, or characteristic in connection with other examples, whether or not explicitly stated herein.

Figure 1:
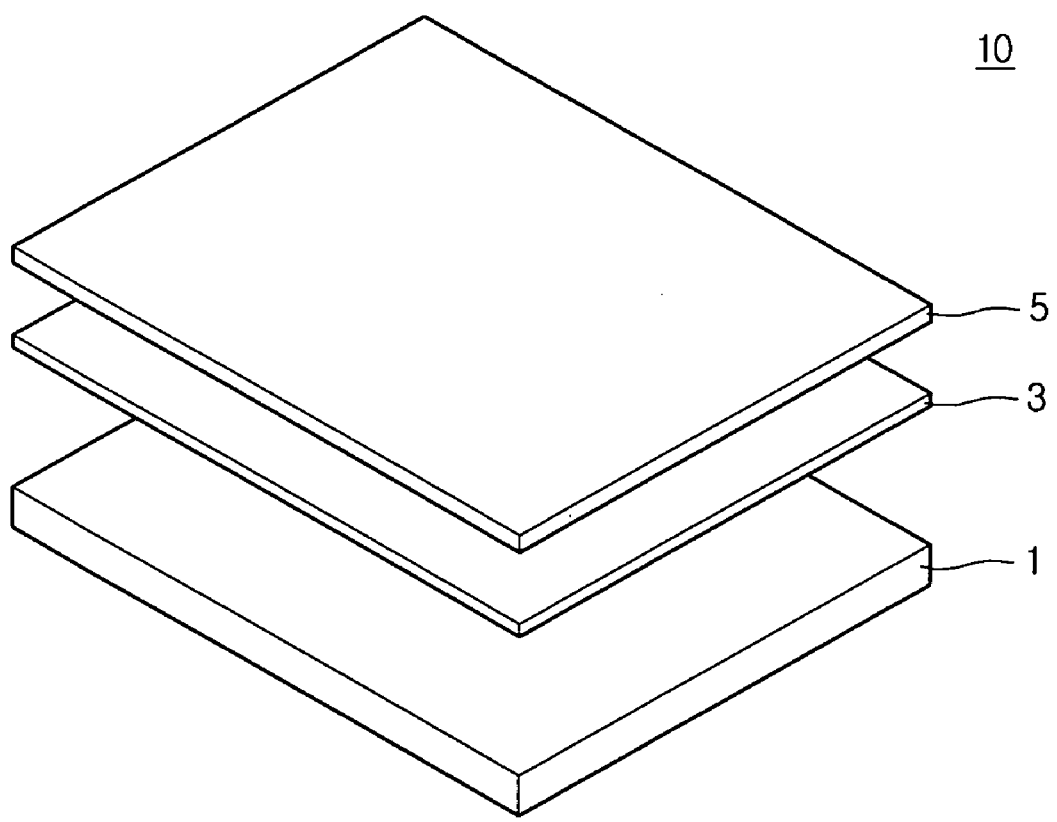
FIG. 1 is an exploded perspective view of a related art display device capable of displaying 2-dimensional and 3-dimensional images.
Figure 2:
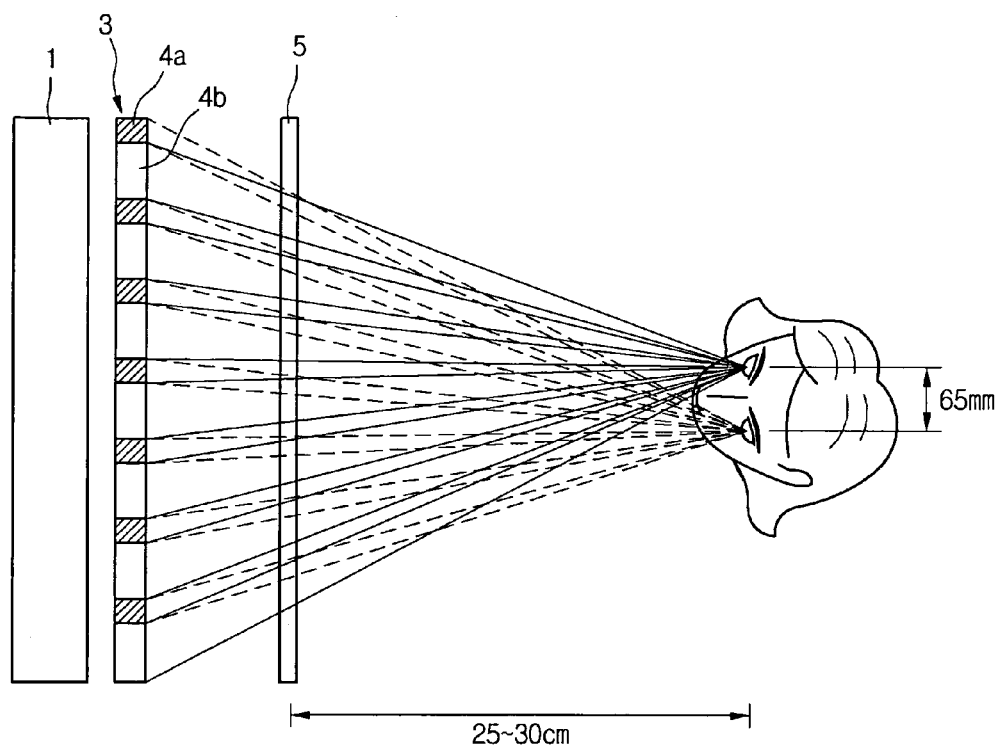
FIG. 2 is a schematic view illustrating display of a 3-dimensional image using the related art display device of FIG. 1.
Figure 3:
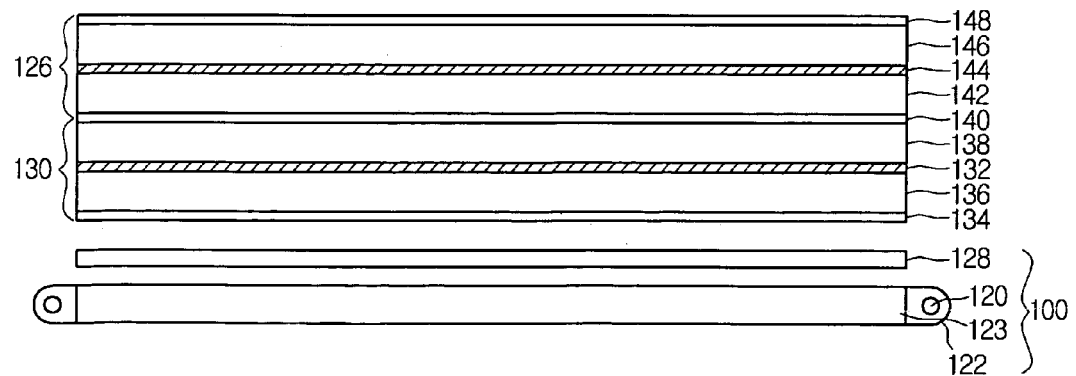
FIG. 3 is a schematic view illustrating a structure of a 2-dimensional and 3-dimensional image display device.

A 2-dimensional and 3-dimensional image display device shown in FIG. 3 includes an image display panel 126, a switching panel 130 acting as a switch for producing a 3-dimensional image, and a backlight unit 100 for supplying light to the switching panel 130 and the image display panel 126. The backlight unit 100 may be configured with a light guide plate 123, a lamp 120, a reflective plate 122 and a diffuser plate 128 for diffusing light.

The image display panel 126 may have a first substrate 146 and a second substrate 142 facing each other with a first liquid crystal layer 144 interposed therebetween, wherein first 148 and second 140 polarizing plates are disposed on outer surfaces of the first and second substrates 146 and 142, respectively.

The first substrate 146 may be a color filter substrate where red, green and blue color filter layers may be formed on a glass substrate. The second substrate 142 may be a thin film transistor (TFT) substrate where a TFT switching device and a pixel electrode are formed on the glass substrate.

The image display panel 126 of the present invention may have a structure such as a twisted nematic (TN) mode and a vertical alignment (VA) structure in which a common electrode is disposed on the color filter substrate and the pixel electrode is disposed on the TFT substrate. Alternatively, the image display panel 126 may have a structure such as an in-plane switching (IPS) mode and a fringe field switching (FFS) mode structure in which the pixel electrode and the common electrode coexist on the TFT substrate.

The switching panel 130, which acts as a parallax barrier may have a third substrate 138 and a fourth substrate 136 facing each other with a second liquid crystal layer 132 interposed therebetween, wherein the second polarizing plate 140 is attached on an outer surface of the third substrate 138 and a third polarizing plate 134 is attached on the fourth substrate 134. The second polarizing plate 140 acts as the polarizing plate for both the image display panel 126 and the switching panel 130, and maintains a separation gap between the image display panel 126 and the switching panel. The third substrate 138 of the switching panel 130 may be formed of a glass material, and the fourth substrate 136 has the IPS mode structure or the FFS mode structure in which the pixel electrode and the common electrode are formed.

The common electrode may be divided into a first common electrode and a second common electrode and the respective electrodes formed on different layers. The first and second common electrodes may be formed such that edge areas thereof are overlapped with each other.

The switching panel 130 may have two switched states: a full white state where light passes through when all regions are transmissive regions; and, a state where a parallax barrier pattern is formed by blocking the transmissive region of a specific portion of the switching panel 130.

Figure 4:
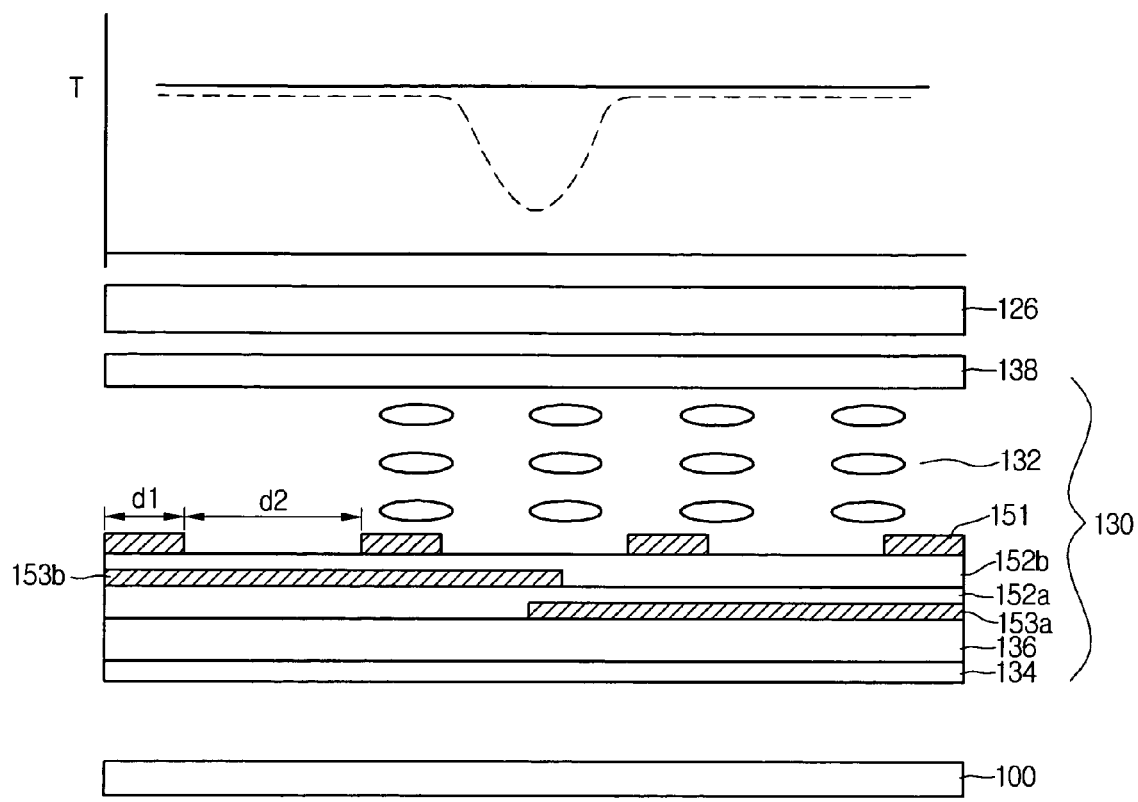
FIG. 4 is a schematic view illustrating a transmissivity characteristic of the display device acting as a switching panel.

FIG. 4 is a schematic view illustrating transmissivity characteristic of the display device. The switching panel 130 may be disposed between the image display panel 126 and the backlight unit 100.

The switching panel is configured such that the third substrate 138 and the fourth substrate 136, are disposed opposite to each other, and the second liquid crystal layer 132 is interposed therebetween. A first common electrode 153a and a second common electrode 153b may be formed on the fourth substrate 136. A first protective layer 152a is formed on the first common electrode 153a and a second protective layer 152b is formed on the second common electrode 153b. A pixel electrode 151 formed of a transparent conductor is disposed on the second protective layer 152b. The first common electrode 152a, the second common electrode 153b and the pixel electrode 151 are formed on different layers, and the first and second common electrodes 153a and 153b are partially overlapped with each other so that they are not spaced apart from each other in a plan view.

The first and second common electrodes 153a and 153b are formed a transparent conductor similarly to the pixel electrode 151A distance d1 is a width of the pixel electrode 151, and a distance d2 is a separation distance between the pixel electrodes 151. In another aspect, the first and second common electrodes 153a and 153b are formed of a opaque conductive material such as a metal. The backlight may be omitted.

Since there is no separation distance between the common electrodes 153a and 153b in a plan view, a degradation of transmissivity does not occur between the common electrodes 153a and 153b.

FIG. 4 also illustrates a transmissivity curve measured across a boundary area between the first and second common electrodes 153a and 153b. The transmissivity of this arrangement is shown by the solid line and is substantially constant. However, the transmissivity (T) may be degraded in a region where the first and second common electrodes 153a and 153b are spaced apart from each other by a predetermined distance in a plan view. This response is shown as the dashed line in FIG. 4. (The corresponding structure is not shown).

The first and second common electrodes 153a and 153b of this example are partially overlapped with each other so that there is no separation distance therebetween in a plan view.

The switching panel 130 may be manufactured by attaching the third substrate 138 and the fourth substrate 136 to each other, and the second liquid crystal layer 132 interposed therebetween. The third and fourth substrates 138 and 136 may be formed, for example, of a glass material.

After depositing a conductive layer on the fourth substrate 136 acting as the lower substrate, the conductive layer may be etched to form the first common electrode 153a. Afterwards, the first protective layer 152a is formed on the fourth substrate 136 having the first common electrode 153a.

After depositing a conductive layer on the fourth substrate 136 where the protective layer 153a has been formed, the conductive layer is etched into a predetermined shape so as to form the second common electrode 153b such that it is partially overlapped with the edge portion of the first common electrode 153a.

After forming the second common electrode 153b, the second protective layer 152b is formed on the fourth substrate 136. Subsequently, a transparent conductive layer is deposited and etched to form the pixel electrode 151.

The first and second common electrode 153a and 153b may be formed of the same transparent material as the pixel electrode 151 or formed of opaque metal The pixel electrode and the common electrode coexist on the lower substrate so that it is possible to embody full-white state uniformly in wide range of viewing angles, or to form the parallax barrier pattern, having a wide viewing angle characteristic.

The light generated from the backlight unit 100 can be uniformly transmitted in a wide viewing angle range when the display device becomes a full-white state for displaying the 2-dimensional image.

By changing the structure of the pixel electrode 151 of the switching panel 130, the transmissivity characteristic may be enhanced so that it is possible to reduce the color change over a range of viewing angles.

Figure 5A:
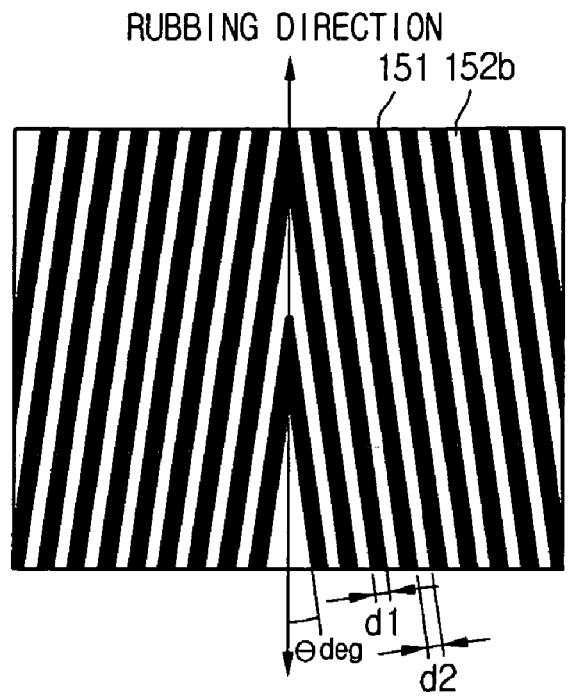
FIGS. 5A and 5B are schematic views illustrating a structure of a pixel electrode of the switching panel.
Figure 5B:
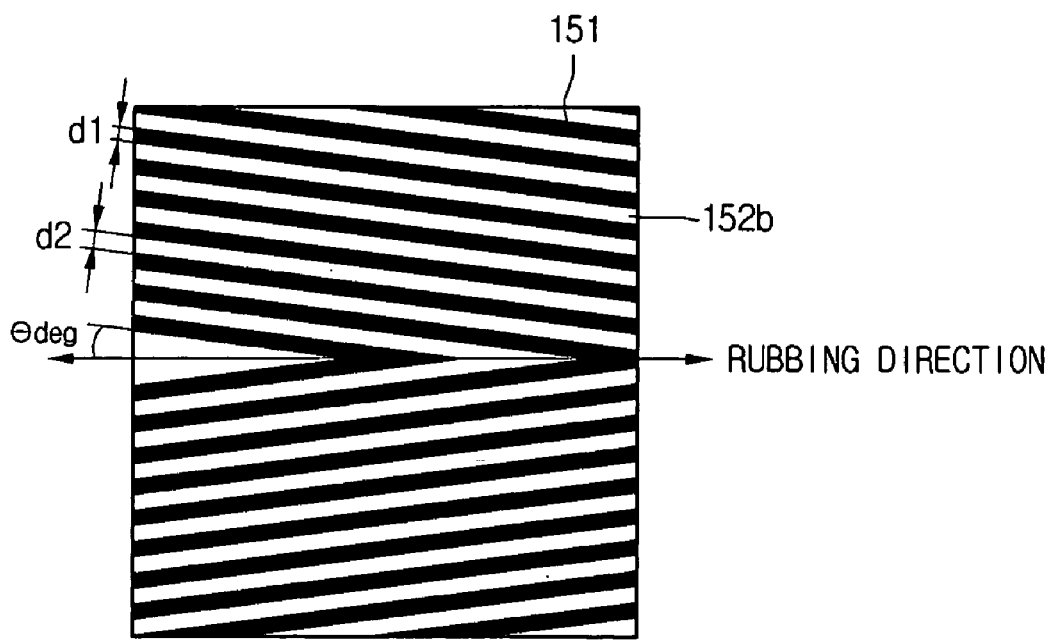

FIGS. 5A and 5B are schematic views illustrating a structure of a pixel electrode of the switching panel. The pixel electrode pattern of the switching panel may be formed such that it maintains a predetermined tilt angle. That is, the pixel electrode of the switching panel may be patterned to maintain a predetermined angle θ with respect to an alignment direction of an alignment layer formed on the lower substrate of the switching panel. The pixel electrode 151 may be formed in shape of parallel or perpendicular pattern along a pixel area.

FIG. 5A illustrates a case where the pixel electrode 151 is patterned such that it is aligned in a perpendicular direction, and FIG. 5B illustrates a case that the pixel electrode 151 is patterned such that it is aligned in a parallel direction.

The pattern of the pixel electrode 151 may have a tilt angle in range of 1° to 20° with respect to the alignment direction of the alignment layer, and the transmissivity characteristic may be optimum when the tilt angle ranges from 3° to 5°. However, the angle for the optimum transmissivity characteristic may vary according to the size of the panel, the liquid crystal, the electrode width, and the distance between the electrodes.

Figure 6:
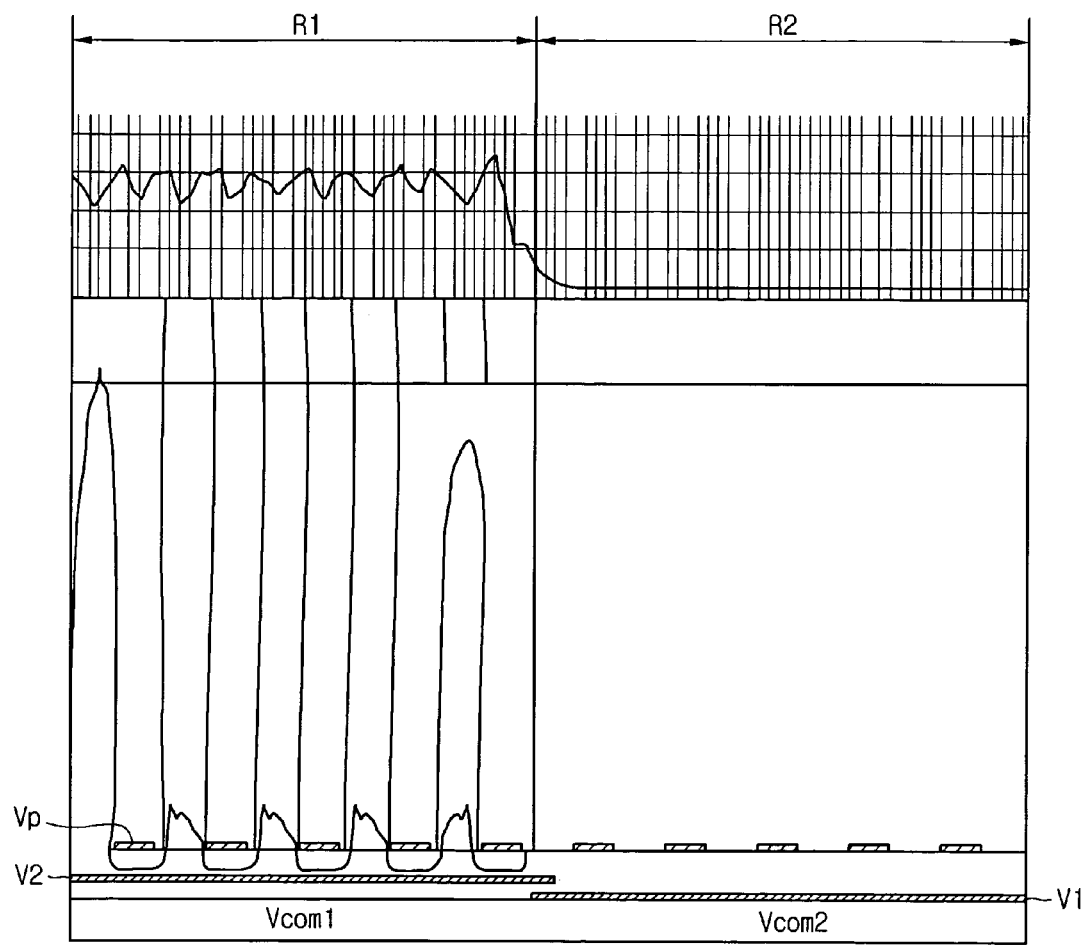
FIG. 6 is a schematic view illustrating characteristic of transmissivity change responsive to a voltage applied to the switching panel.

FIG. 6 is schematic view illustrating characteristic of transmissivity change in response to a voltage applied to the switching panel. The transmissivity characteristics of respective common electrode regions to which the electric field is applied and not applied are shown.

When the light is transmitted in a region corresponding to one common electrode but is blocked in a region corresponding to the other common electrode, the parallax barrier pattern is formed so that it is possible to view the 2-dimensional images as the 3-dimensional image.

The driving characteristic of the switching panel may be expressed as a as Vcomp=Vp+Vop, where the Vcom, the Vp and the Vop denote a common voltage applied to the common electrode, a voltage applied to a pixel electrode, and a voltage generating an electric field by the operation of the switching panel, respectively.

A voltage Vop (=V2−Vp) is generated when a voltage applied to the first common electrode Vcomp1 is V2 and the voltage applied to the pixel electrode is Vp. Thus, the light is transmitted by means of the electric field (R1 region). However, when the voltage applied to the second common electrode Vcomp2 is V1 which is equal to the voltage Vp applied to the pixel electrode, the electric field is generated between the common electrode and the pixel electrode so that the transmissivity is 0 (R2 region).

The parallax barrier pattern is thus formed where transmissive regions and the blocking regions are repeated alternately, and an observer perceives the images and binocular parallax so as see the image three-dimensionally.

Figure 7A:
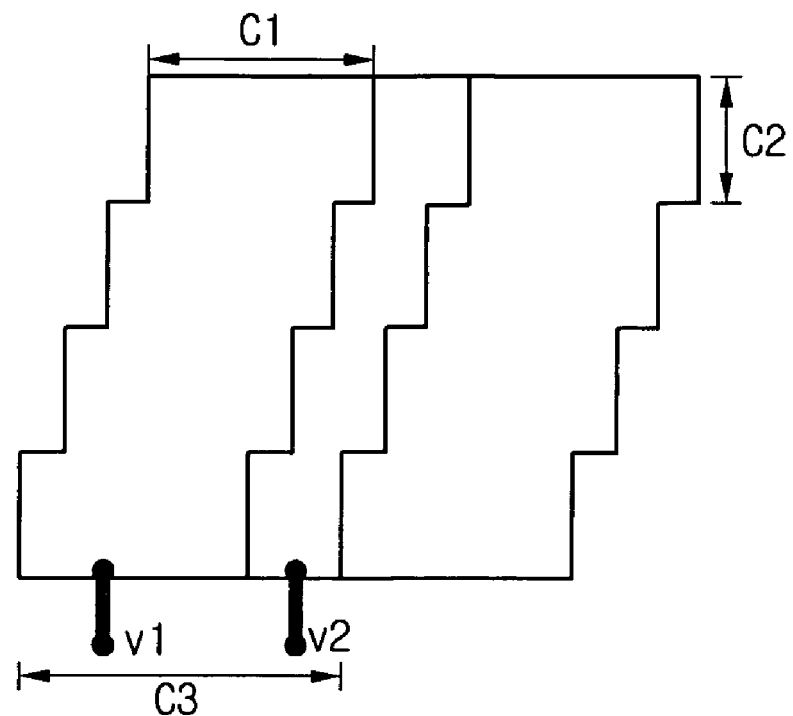
FIGS. 7A to 7C are schematic views illustrating a common electrode structure.
Figure 7B:
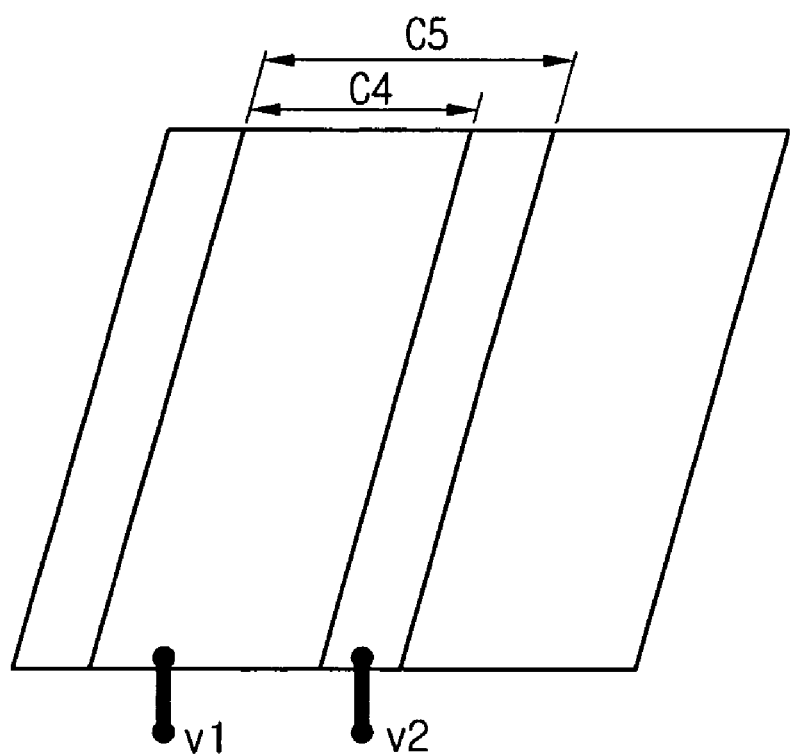
Figure 7C:
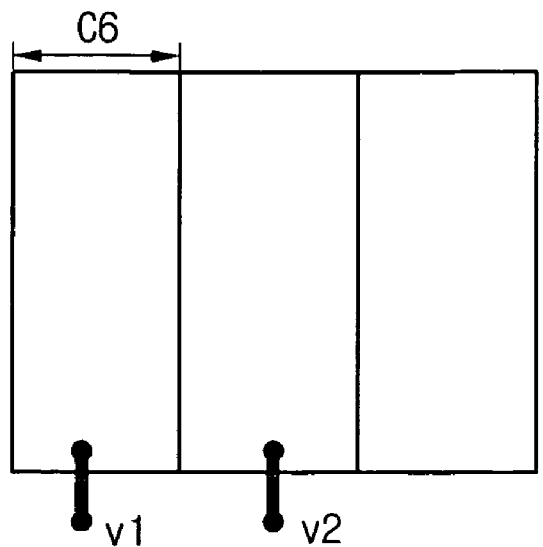

FIGS. 5A and 5B illustrated an example where that the pattern of the pixel electrode may be modified, while FIGS. 7A to 7C illustrate an example where the pattern of the common electrode may be modified.

After forming the common electrode such that it is inclined at a predetermined angle (α deg), both edge regions thereof may be patterned in shape of a step. Herein, a denotation C1 means the width of the first common electrode Vcomp1, a denotation C2 means a distance between steps in the common electrode, and a denotation C3 means the width of adjacent two common electrodes, i.e., the first common electrode 153a and the second common electrode 153b. Each common electrode is inclined at the predetermined tilt angle (α deg).

The first and second common electrodes 153a and 153b are formed on different layers, respectively, such that the edge portions are overlapped with each other. Therefore, there is no separation distance therebetween in a plan view.

FIG. 7B illustrates a common electrode structure in which the common electrodes are inclined at the predetermined tilt angle (α deg) without the step structure, of FIG. 7A. FIG. 7C illustrates a common electrode structure in which the common electrodes having an equal size are formed in parallel without a tilt. C6 is the width of each common electrode FIG. 7B illustrates a common electrode structure in which the common electrodes are inclined at the predetermined tilt angle (α deg) without the step structure, of FIG. 7A. FIG. 7C illustrates a common electrode structure in which the common electrodes having an equal size are formed in parallel without a tilt. C6 is the width of each common electrode As described above, by variously forming the common electrode pattern of the switching panel, the parallax barrier pattern is formed in various shapes so that it is possible to enhance an image quality of the a displayed 2 or 3-dimensional image. Therefore, the tile angle, width, or pattern shape of the common electrode may be selectively applied to each display device according to the size of the display device and a kind of displayed image.

In addition, when forming the common electrode in various shapes, the transmissivity characteristic over a range of viewing angles is improved so that it is possible to reduce the color change phenomenon as a function of viewing angle.

The pixel electrode patterns of FIGS. 5A and 5B, and the common electrode pattern of FIGS. 7A to 7C may be applied to the switching panel, respectively or simultaneously.

Figure 8:
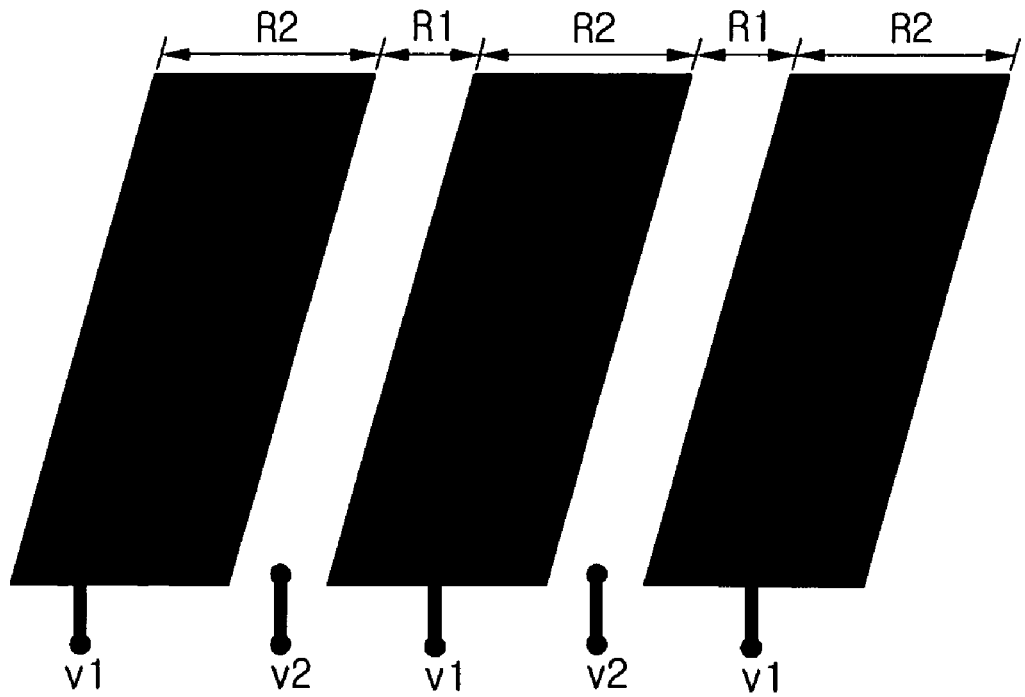
FIG. 8 is a schematic view how the switching panel forms a parallax barrier pattern.

FIG. 8 is a schematic showing the formation of the parallax barrier pattern of the switching panel. The parallax barrier pattern is formed by forming the transmissive region R1 and the blocking region R2, which are illustrated in FIG. 6.

Figure 9A:
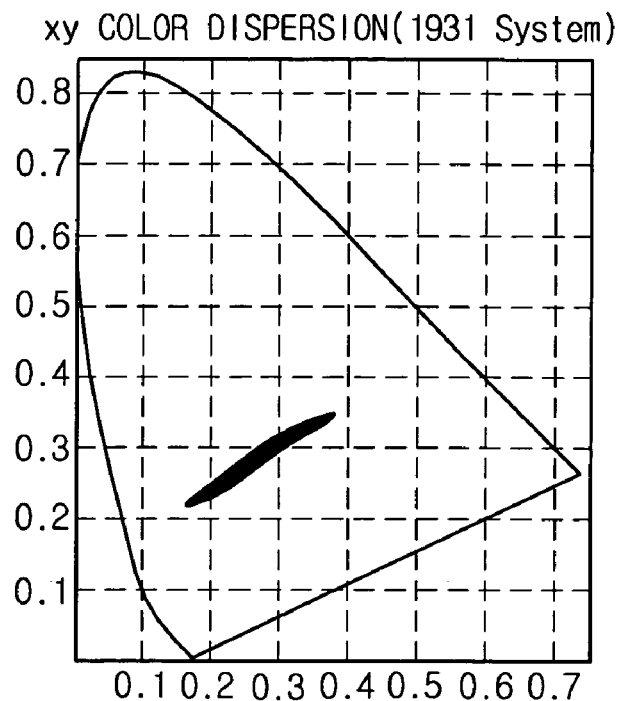
FIG. 9A is a graph illustrating a color change versus a viewing angle when using the related art switching panel.
Figure 9B:
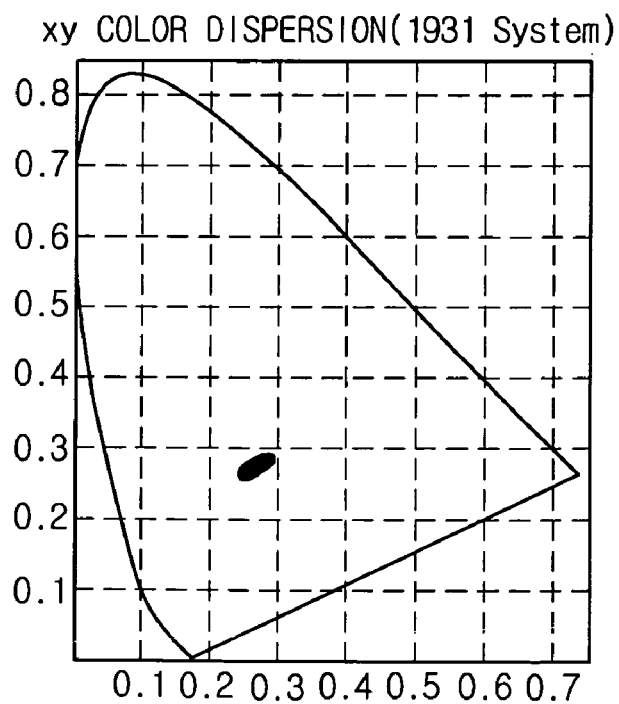
FIG. 9B is a graph illustrating a color change versus a viewing angle when using the switching panel of FIG. 3.

FIG. 9A is a graph illustrating a color change versus a viewing angle when using the related art switching panel, and FIG. 9B is a graph illustrating a color change versus a viewing angle when using the switching panels described herein. When applying the switching panel having the TN mode electrode structure according to the related art display device, that the color change becomes large over a range of the viewing angles.

As shown in FIG. 9B, the color change over a range of viewing angles is smaller, when using switching panel having the IPS or FFS mode structure in which the pixel electrode and the common electrode are formed on the lower substrate The tilt angle ranges from 5° to 12° and the distance between the electrodes is about 3.2-4.2 μm. The angle for the optimum transmissivity characteristic may vary according to the size of the panel, the liquid crystal, the electrode width, and the distance between the electrodes.

As described above, when forming the pixel electrode pattern or the common electrode pattern, the transmissivity characteristic may be enhanced so as to improve the image grade of the display device.

Although only a few examples of this invention have been described in detail above, those skilled in the art will readily appreciate that many modifications are possible without materially departing from the novel teachings and advantages of the invention. Accordingly, all such modifications are intended to be included within the scope of this invention as defined in the following claims.

What is claimed is:

1. A display device comprising:
   an image display panel including a color filter layer and a thin film transistor layer;
   a switching panel including upper and lower substrates with a liquid crystal layer interposed therebetween; and
   a backlight unit disposed more distal from an observer than the image display panel or the switching panel,
   wherein a pixel electrode, and first and second common electrodes are formed on the lower substrate and apply an electric field to the liquid crystal layer,
   wherein the first and second common electrodes are formed on different layers, respectively,
   wherein the first and second common electrodes are partially overlapped, and
   wherein the pixel electrode comprises a transparent conductor, and the first and second common electrodes comprise an opaque conductive material.

2. The display device of claim 1, wherein the upper substrate is a glass substrate.

3. The display device of claim 1, wherein the pixel electrode is formed such that it is inclined at a predetermined angle with respect to an alignment direction of an alignment layer formed on the lower substrate.

4. The display device of claim 3, wherein an angle between the pixel electrode and the alignment direction is in a range of 3° to 5°.

5. The display device of claim 1, wherein the first and second common electrodes are formed such that they are inclined at a predetermined tilt angle with respect to an alignment direction of an alignment layer formed on the substrate.

6. The display device of claim 1, wherein the first and second common electrodes have different widths.

7. The display device of claim 1, wherein the first and second common electrodes have step-shaped structures.

* * * * *